(12) United States Patent
Azais et al.

(10) Patent No.: US 8,634,181 B2
(45) Date of Patent: Jan. 21, 2014

(54) MULTIPLE-TRACK SUPERCAPACITOR

(75) Inventors: Philippe Azais, Quimper (FR); Olivier Caumont, Quimper (FR); Jean-Michel Depond, Quimper (FR)

(73) Assignee: Batscap, Ergue Gaberic (FR)

( * ) Notice: Subject to any disclaimer, the term of this patent is extended or adjusted under 35 U.S.C. 154(b) by 306 days.

(21) Appl. No.: 12/918,056

(22) PCT Filed: Feb. 12, 2009

(86) PCT No.: PCT/EP2009/051668
§ 371 (c)(1),
(2), (4) Date: Aug. 17, 2010

(87) PCT Pub. No.: WO2009/103661
PCT Pub. Date: Aug. 27, 2009

(65) Prior Publication Data
US 2010/0321864 A1 Dec. 23, 2010

(30) Foreign Application Priority Data

Feb. 19, 2008 (FR) ...................... 08 51058

(51) Int. Cl.
*H01G 9/00* (2006.01)
(52) U.S. Cl.
USPC ......................................... 361/502
(58) Field of Classification Search
USPC ......................................... 361/502
See application file for complete search history.

(56) References Cited

U.S. PATENT DOCUMENTS

| | | | |
|---|---|---|---|
| 2,505,545 A | 4/1950 | Hopkins et al. | |
| 2,949,570 A | 8/1960 | Rayburn | |
| 3,106,671 A | 10/1963 | Coleman et al. | |
| 3,292,063 A | 12/1966 | Kellerman | |
| 3,622,843 A | 11/1971 | Vermilyea et al. | |
| 4,051,304 A * | 9/1977 | Snook ............................. | 429/94 |
| 4,327,395 A | 4/1982 | Yagitani et al. | |
| 4,638,402 A | 1/1987 | Lim et al. | |
| 5,047,300 A | 9/1991 | Juergens | |
| 5,453,906 A * | 9/1995 | Doll ............................. | 361/273 |
| 6,021,039 A | 2/2000 | Inagawa | |
| 6,094,788 A | 8/2000 | Farahmandi et al. | |

(Continued)

FOREIGN PATENT DOCUMENTS

| | | |
|---|---|---|
| CH | 84 526 A | 7/1920 |
| DE | 328 592 C | 10/1920 |

(Continued)

OTHER PUBLICATIONS

Zhu et al., Chemical and electrochemical ageing of carbon materials used in supercapacitor electrodes, Nov. 2008, pp. 1829-1840, Carbon 46, issue 14.

(Continued)

*Primary Examiner* — David M Sinclair
(74) *Attorney, Agent, or Firm* — Blakely Sokoloff Taylor & Zafman

(57) ABSTRACT

The invention relates to a supercapacitor that comprises at least two juxtaposed complexes (1, 2) spaced by a distance d, and at least one common complex (3) located opposite the two juxtaposed complexes (1, 2) and spaced therefrom by at least one spacer (4), the spacer (4) and the complexes (1, 2, 3) being spirally wound together in order to form a coiled element.

23 Claims, 5 Drawing Sheets

(56) References Cited

U.S. PATENT DOCUMENTS

Figure 1:
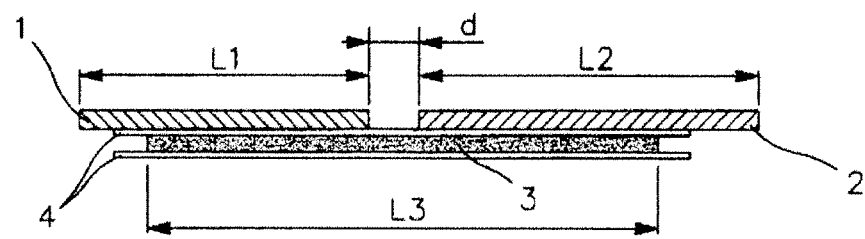

| | | |
|---|---|---|
| 6,366,445 B1 | 4/2002 | Bruvelaitis et al. |
| 6,510,043 B1 | 1/2003 | Shiue et al. |
| 6,579,327 B1 | 6/2003 | Shiue et al. |
| 6,954,249 B2 | 10/2005 | Muramatsu et al. |
| 7,054,139 B2 * | 5/2006 | James et al. .......... 361/512 |
| 7,145,763 B2 | 12/2006 | Kim et al. |
| 7,462,418 B2 * | 12/2008 | Matsumoto ............ 429/94 |
| 2002/0039275 A1 | 4/2002 | Takeuchi et al. |
| 2006/0035140 A1 * | 2/2006 | Matsumoto ............ 429/160 |
| 2006/0221551 A1 | 10/2006 | Kim et al. |
| 2006/0263649 A1 * | 11/2006 | Sohn ............... 429/7 |

FOREIGN PATENT DOCUMENTS

| | | |
|---|---|---|
| EP | 0 109 100 A1 | 5/1984 |
| EP | 0 786 786 A1 | 7/1997 |
| EP | 1 471 545 A1 | 10/2004 |
| EP | 1 801 825 A1 | 6/2007 |
| FR | 848 360 | 10/1939 |
| FR | 1 526 673 | 5/1968 |
| FR | 2 457 004 | 12/1980 |
| GB | 306517 | 6/1930 |
| GB | 381017 | 9/1932 |
| GB | 846083 | 8/1960 |
| GB | 909350 | 10/1962 |
| GB | 1 220 567 | 1/1971 |
| JP | 59176136 U * | 11/1984 |
| WO | WO 98/15962 | 4/1998 |
| WO | WO 2004/075320 A2 | 9/2004 |

OTHER PUBLICATIONS

Azais et al., Causes of supercapacitors ageing in organic electrolyte, Journal of Power Sources 171, Jul. 2007, pp. 1046-1053.

Hahn et al., Gas evolution in activated carbon/propylene carbonate based double-layer 1 capacitors, Electrochemistry Communications 7, Aug. 2005, pp. 925-930.

Kotz et al., Principles and applications of electrochemical capacitors, Electrochimica Acta 45, 2000, pp. 2483-2498.

Azais, Causes of ageing of supercapacitors based on activated carbon electrodes and organic electrolyte, PhD dissertation, 2003, Orléans, France.

\* cited by examiner

MULTIPLE-TRACK SUPERCAPACITOR

This is a non-provisional application claiming the benefit of International application number PCT/EP2009/051668 filed Feb. 12, 2009.

The present invention relates to the general technical field of supercapacitors, i.e. capacitors with a double electrochemical layer (or EDLC acronym of "Electrochemical Double Layer Capacitor").

GENERAL PRESENTATION OF THE PRIOR ART

A supercapacitor is a means for storing energy with which it is possible to obtain a power density and an intermediate energy density between those of dielectric capacitors and batteries. Their discharge time is generally of the order of a few seconds.

A supercapacitor conventionally comprises a cylindrical wound element comprising at least two electrodes. Each electrode is made from a mixture of active coal (also called "active material"), of carbon black and polymers. During a so-called extrusion step, a conductive paste is deposited on an aluminium collector which is used as a current collector. Both electrodes are separated by a porous separator in order to avoid short-circuits between both electrodes. During a so-called impregnation step, the supercapacitor is filled with an electrolyte. This electrolyte consists of a salt dissolved in a solvent, generally acetonitrile. This salt is separated into two charged species which are called ions (for example: $BF_4^-$ and $TEA^+$).

The thickness of an electrode is typically 100 μm. The ions have a size of the order of $1/1000^{th}$ of a μm, i.e. 100,000 times smaller than the thickness of the electrode. Active coal (or active material) is an extremely porous material.

When a voltage is applied with a DC generator between two electrodes of the supercapacitor, the ions move in the porosity very close to the surface of the coal. The greater the amount of ions present at the surface of coal, the larger is the capacitance.

The amount of energy stored in a supercapacitor depends on the voltage applied between both electrodes and on the total capacitance of the supercapacitor.

Many investigations have shown that the higher the operating voltage of the supercapacitors, the shorter is the lifetime, because of very large generation of gas in the supercapacitor.

This gas generation is related to the decomposition of the material forming the electrolyte, this decomposition being a function of the applied voltage between the electrodes of the supercapacitor.

For example, the decomposition voltage of pure acetonitrile is 5.9V.

Presently, the reference voltage applied to the electrodes of supercapacitors is 2.7V (see notably WO 9 815 962 which teaches to the person skilled in the art that the voltage of a supercapacitor should be limited in order not to degrade too much the electrolyte).

In order to remedy this drawback, it is known how to electrically connect several supercapacitors to each other in order to form a module. This allows an increase in the voltage applied to the module.

In order to electrically connect two adjacent supercapacitors, connection means comprising two lids and a strap are used.

Each lid is capable of capping a respective supercapacitor so as to be electrically connected to the latter, for example by soldering.

Figure 11:
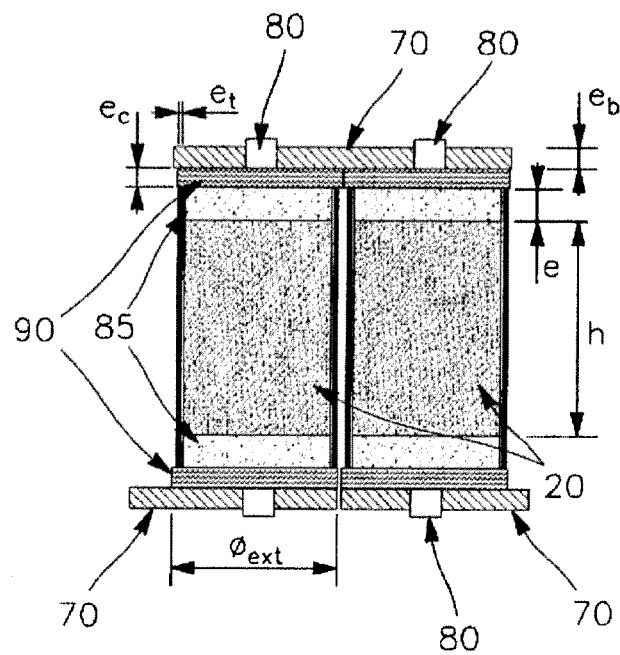

As illustrated in FIG. 11, each lid 90 further comprises a connection terminal 80 capable of coming into contact with a through-bore of the strap 70, so as to electrically connect both adjacent supercapacitors 20.

However, such supercapacitors have drawbacks.

Notably, the volume and the mass of two supercapacitors electrically connected through a strap and two lids are significant.

Moreover, the manufacturing cost related to the purchase and mounting of the straps and lids for connecting both supercapacitors is significant.

Also, the series resistance Rs between two electrically connected supercapacitors—which corresponds to the sum of the resistances of the supercapacitors and of the connection means (strap+lid+solder)—is significant.

The general object of the invention is to propose a supercapacitor, the lifetime of which is increased at the reference voltage.

Another object of the present invention is to propose a supercapacitor in which gas generation is limited.

Another object of the present invention is to propose a supercapacitor capable of supporting a voltage above the reference voltage without undergoing any degradation.

PRESENTATION OF THE INVENTION

For this purpose, a supercapacitor is provided comprising at least two juxtaposed complexes spaced apart by a distance d and at least one common complex facing both juxtaposed complexes and separated from the latter by at least one separator, the separator and the complexes being wound together in turns in order to form a wound element.

"Complex" designates the association of a current collector and of at least one electrode, the current collector and the electrode having a common electrically conducting surface.

"Juxtaposed complexes" designate two coplanar complexes (before being wound in turns in order to form a wound element) and separated by an electronic insulating space of width d. In other words, by "juxtaposed complexes" are meant two complexes spaced apart by a distance d according to a direction parallel to the longitudinal axis (i.e. the winding axis) of the wound element.

"Common complex" designates any association of complexes in electronic continuity.

The separator(s) extend(s) beyond the electrodes of each complex facing each other but not beyond the collectors of the complexes being used as a connection to the outside.

Preferred but non-limiting aspects of the supercapacitor according to the invention are the following:

- the separator consists of at least two portions spaced out by a distance w of less than the distance d, each of the portions entirely separating the complexes facing each other,
- the distance w is larger than 1 mm,
- each complex comprises two opposite electrodes on either side of current collector so that each electrode has a common electrically conducting surface with a respective face of the current collector,
- the common complex comprises at least two juxtaposed electrodes spaced out by a distance g, each electrode being positioned facing an electrode of juxtaposed complexes,
- the distance g is equal to the distance d,
- the electrodes of the common complex are of different thicknesses,
- the widths of the electrodes of the common complex are different, the thicknesses of the electrodes of the juxtaposed complexes are different, the lengths of the complexes facing each other are different, the widths of the electrodes of the juxtaposed complexes are different, the electrodes of the complexes are of different natures, the lengths, widths, thicknesses and natures of the electrodes of the juxtaposed complexes are equal, the base of the wound element orthogonal to the winding axis is of circular shape, or the base of the wound element orthogonal to the winding axis is of hexagonal shape, or the base of the wound element orthogonal to the winding axis is of triangular shape, or the base of the wound element orthogonal to the winding axis is of octagonal shape, or the base of the wound element orthogonal to the winding axis is of rectangular shape, the angles of the wound element are non-protruding, the base of the wound element orthogonal to the winding axis is of elliptical shape, the supercapacitor contains two juxtaposed complexes and a common complex, both juxtaposed complexes being connected to the outside, the supercapacitor contains three complexes connected to the outside and juxtaposed two by two, and a common complex, the supercapacitor contains two sets of a complex connected to the outside juxtaposed to a common complex, both of these sets facing each other so that the common complex of the first set is facing the complex connected to the outside of the second set, the supercapacitor comprises at least two juxtaposed complexes having at least one facing common complex separated by at least one separator and wound together as turns in order to form a first wound element, the supercapacitor further comprising at least two other juxtaposed complexes having at least one other facing common complex separated by at least one other separator, the latter being wound together in turns around the first wound element so as to form at least one second wound element, these successive wound elements being separated by an electronically insulating space, the supercapacitor is laid out so that there exists a common complex to two successive wound elements.

The invention also relates to a module comprising a casing in which is positioned at least one supercapacitor as described above.

Advantageously, the module may both comprise storage sets according to the invention and storage sets of the prior art, as illustrated in FIG. 11. In other words, the module may further comprise a supercapacitor according to the invention, a standard supercapacitor comprising a cylindrical wound element including at least two electrodes and at least one separator wound together in turns in order to form a wound element positioned in a casing and lids intended to close the casing, this standard supercapacitor being electrically connected to a supercapacitor according to the invention via at least one connecting strap.

PRESENTATION OF THE FIGURES

Figure 12:
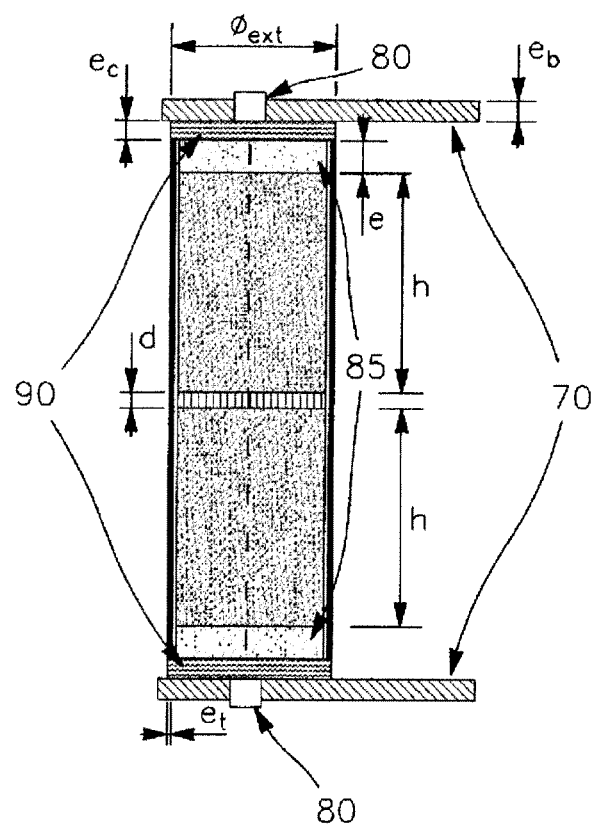
Figure 13A:
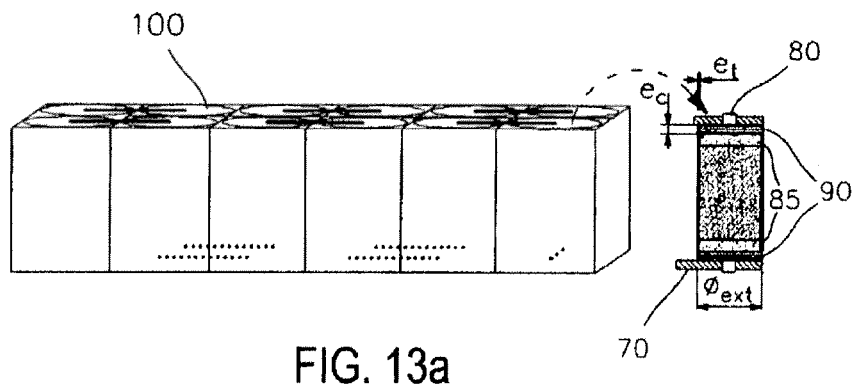
Figure 13B:
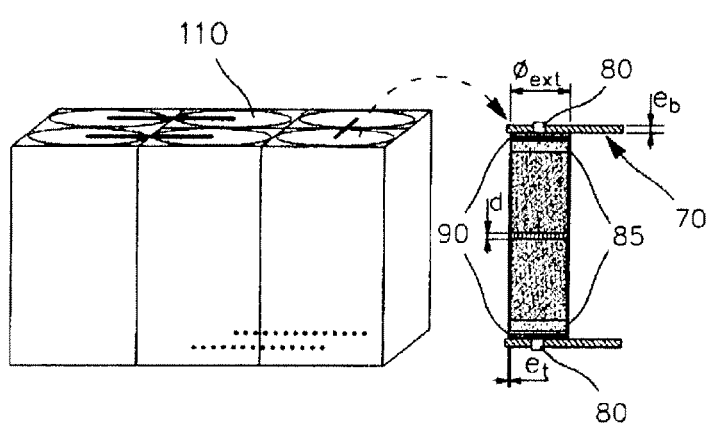
Figure 13C:
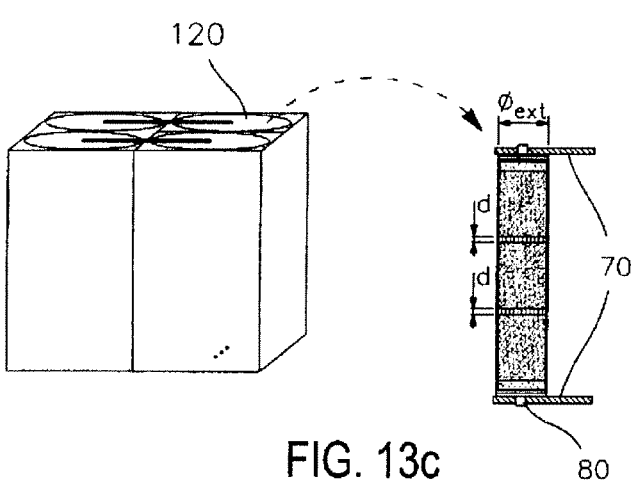

Other features, objects and advantages of the present invention will further become apparent from the description which follows, which is purely illustrative and non-limiting and should be read with reference to the appended drawings wherein:

FIGS. 1-10 illustrate different embodiments of a supercapacitor according to the invention, FIG. 11 illustrates a module of the prior art, FIG. 12 illustrates an embodiment of the supercapacitor according to the invention once the different elements making it up are wound together in order to form a wound element, FIGS. 13a-13c illustrate the volumes occupied by 12 supercapacitors of the prior art, six two-track supercapacitors according to the invention, and four three-track supercapacitors according to the invention, respectively.

DESCRIPTION OF THE INVENTION

Different embodiments of the supercapacitor according to the invention will now be described with reference to FIGS. 1-13. In these different figures, equivalent elements of the supercapacitor bear the same numerical references.

With reference to FIG. 1, the different elements of a first embodiment of the supercapacitor are illustrated.

The supercapacitor comprises two juxtaposed complexes 1, 2 spaced apart by a distance d.

Advantageously, the distance d between the juxtaposed complexes 1, 2 is provided to be sufficient for electrically insulating the juxtaposed complexes 1, 2 from each other.

The supercapacitor also comprises a complex 3 of width L3, a so-called "common complex" positioned facing both juxtaposed complexes 1, 2.

The supercapacitor further comprises two separators 4. The separators 4 provide electric insulation of the juxtaposed complexes 1, 2 from the common complex 3. One of the separators is positioned between the common complex and the juxtaposed complexes. The other separator is positioned on the other face of the common complex so that the common complex is located between the separators.

Figure 2:
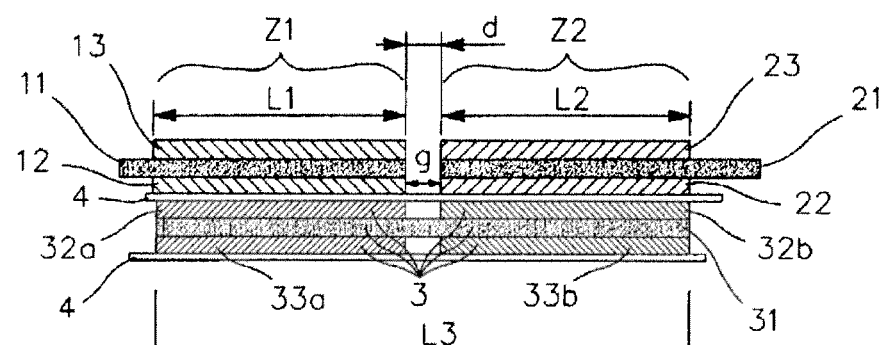

Facing FIG. 2, each complex 1, 2, 3 comprises a current collector 11, 21, 31 and an electrode 12, 22, 32 (the electrode 32 being illustrated in the figure by both of its portions 32a and 32b) having a common electrically conducting face with the current collector.

The areas Z1 and Z2 facing the juxtaposed and common complexes define two supercapacitor cells, the capacitances of which are determined by their respective widths. The continuity of the common complex allows both supercapacitor cells to be placed in series.

The complexes 1, 3 and separators 4 respectively consist of one or more superposed sheets.

Advantageously, the juxtaposed complexes 1, 2, the common complex 3 and the separators 4 are wound together in turns in order to form a wound element.

The proposed solution is less costly than the supercapacitors of prior art described earlier. Indeed, the number of straps, of lids and of tubes (being used as a housing for the wound elements) for electrically connecting two supercapacitor cells is less than the number of straps, lids and tubes required for the electric connection of several supercapacitors of the prior art.

Moreover, the solution proposed above allows the series resistance $R_S$ of the system to be reduced (by reducing the number of lids and straps required for connecting the supercapacitor cells as compared with the number of lids and straps required for connecting two adjacent supercapacitors of the prior art), and the admissible energy per unit volume may be significantly increased while optimizing the capacitance.

The advantages related to the removal of the straps and lids for connecting two supercapacitor cells in series are the following:
- increase in the unit voltage of the winding but a priori without any gain in total stored energy,
- optimization of the connections between windings,
- decrease in the resistance $R_S$ between two supercapacitor cells connected in series,
- mass decrease as compared with two supercapacitors of the prior art connected in series,
- reduction in the volume as compared with two supercapacitors of the prior art connected in series,
- therefore increase in the hulk and mass densities of the energies and powers,
- non-reduction in the internal free volume as compared with a series association of supercapacitors of the one-track prior art (standards),
- gain in time from a manufacturing method point of view (n cells in a single supercapacitor).

In the embodiment illustrated in FIG. 1, each juxtaposed complex 1, 2 extends beyond a respective end of the wound element so as to be electrically connected with the outside. One 1 of the juxtaposed complexes 1, is used as an anode of the supercapacitor and the other one 2 is used as a cathode of the supercapacitor.

The common complex 3 is not connected with the outside and is less wide than the separators 4. The person skilled in the art then easily understands that the common complex 3 plays the role:
- of a cathode for the juxtaposed complex 1 used as an anode,
- of an anode for the juxtaposed complex 2 used as a cathode.

FIG. 2 is a detailed illustration of the general diagram illustrated in FIG. 1.

Advantageously, each complex 1, 2, 3 may comprise two opposite electrodes 12, 13, 22, 23, 32, 33 on either side of the current collector 11, 21, 31. Each electrode 12, 13, 22, 23, 32 (the electrode 32 being illustrated in the figure by its two portions 32a and 32b spaced apart by a distance g), 33 (the common complex 3 also itself comprises two juxtaposed electrodes 33a, 33b also spaced apart by a distance in the figure, the distance g may be larger than or equal to the distance d) has an electrically conducting surface common with a respective face of the current collector 11, 21, 31.

This allows the amount of active material of thereby formed supercapacitor to be doubled, therefore the bulk capacitance of the latter may be increased and therefore the admissible energy by the supercapacitor may be increased.

With this, it is possible to facilitate the winding in turns of the complexes and separators.

Each of these electrodes 32a, 32b face a respective electrode 12, 22 of the juxtaposed complexes 1, 2

The common complex 3 also comprises two other electrodes 33a, 33b opposite to both juxtaposed electrodes 32a, 32b. Both of these electrodes are in electric contact with the other face of the current collector 3.

More precisely, respectingly, each of the other electrodes 33a, 33b is opposite to one of the other juxtaposed electrodes 32a, 32b of the common complex 3.

In other words, the common complex 3 comprises four electrodes 32a, 32b, 33a, 33b juxtaposed two by two and symmetrically positioned relatively to the current collector 31 of the common complex 3.

The space g between the electrodes 32a/32b, 33a/33b of the common complex 3 may be achieved by means of a mask positioned on either side of the current collector 31 during coating (or extrusion) of active material on the collector 31, the mask being continuously removed during the method for manufacturing the common complex.

In an embodiment, the electrodes of the different complexes 1, 2, 3 are identical. In other words, the electrodes of the different complexes have equal lengths, equal widths, equal thicknesses and are made in a same material.

With this, it is possible to obtain a symmetrical supercapacitor with two tracks.

However, the electrodes of the different complexes 1, 2, 3 may be different (in terms of length and/or width and/or thickness and/or nature of the material making them up).

With this, it is possible to obtain a dissymmetrical supercapacitor, i.e. a supercapacitor in which the volume of the anode of the supercapacitor is different from the volume of the cathode of the supercapacitor.

By working with a dissymmetrical supercapacitor, it is possible to optimize:
- the capacitance of the supercapacitor on the one hand, and
- the aging of the supercapacitor on the other hand, because of better control on the potential of each electrode.

Dissymmetry of the supercapacitor may be obtained for example by varying the thickness of the electrodes on the juxtaposed complexes, or by varying the width of the electrodes, so that the positive and negative electrodes have different volumes.

Figure 3:
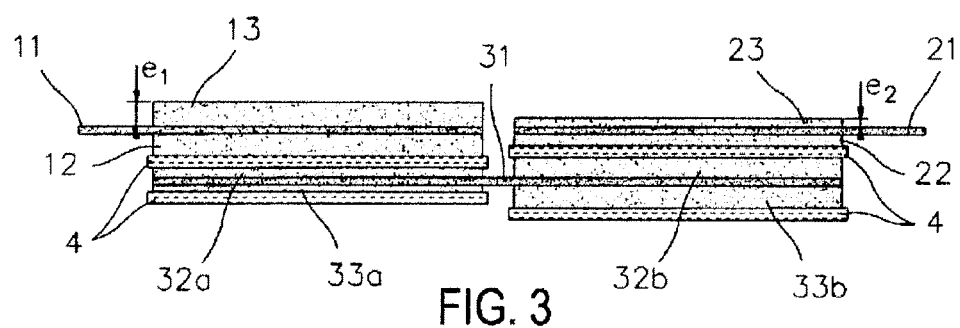

With reference to FIG. 3, an embodiment is illustrated in which anodes and cathodes of the supercapacitor are dissymmetrical. The juxtaposed complexes 1, 2 each comprise two electrodes 12, 13 and 22, 23. The common complex 3 also comprises four electrodes 32a, 32b, 33a, 33b.

The electrodes 12, 13 of the first 1 of the juxtaposed complexes 1, 2 are each of a first thickness $e_1$ and the electrodes 22, 23 of the second 2 of the juxtaposed complexes 1, 2 are each of a second thickness $e_2$ different from the first thickness $e_1$.

Further, the electrodes 32a, 33a of the common complex 3 facing the first 1 of the juxtaposed complexes 1, 2 are each of a thickness equal to the second thickness $e_2$, and the electrodes 32b, 33b of the common complex 3 facing the second 2 of the juxtaposed complexes 1, 2 are each of a thickness equal to the first thickness $e_1$.

In other words, the thicknesses of the electrodes 12, 13 and 32b, 33b forming an anode are different from the thicknesses of the electrodes 22, 23 and 32a, 33a forming a cathode.

With this, it is possible to obtain a dissymmetrical supercapacitor comprising two supercapacitors with a priori different capacitances, connected in series.

Figure 4:
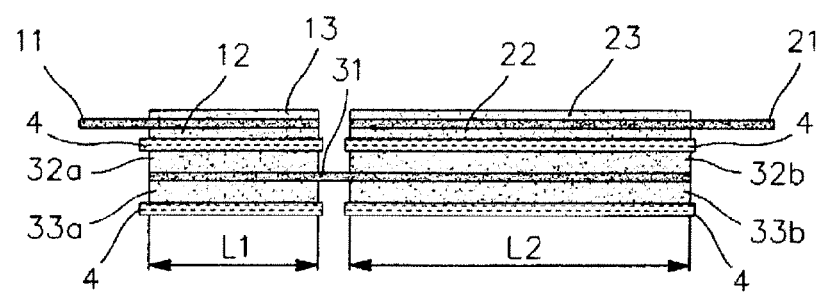

With reference to FIG. 4, another embodiment is illustrated in which anodes and cathodes of the supercapacitor are dissymmetrical.

In this embodiment, the thickness of each of the electrodes 12, 13, 22, 23 of the juxtaposed complexes 1, 2 is identical. Moreover, all the electrodes 32a, 32b, 33a, 33b of the common complex 3 have the same thickness.

In order to obtain dissymmetry, the electrode thickness on the common complex side 3 is different from the electrode thickness on the juxtaposed complexes' side 1, 2.

Moreover, the width L1 of the electrodes 12, 13 of the first 1 of the juxtaposed complexes 1, 2 is different from the width L2 of the electrodes 22, 23 of the second 2 of the juxtaposed complexes 1, 2, the width of the electrodes 32a, 33a (32b, 33b respectively) of the common complex 3 being equal to the width L1 (L2 respectively) of the electrodes of the juxtaposed complex 1 (2 respectively) facing it.

Figure 5:
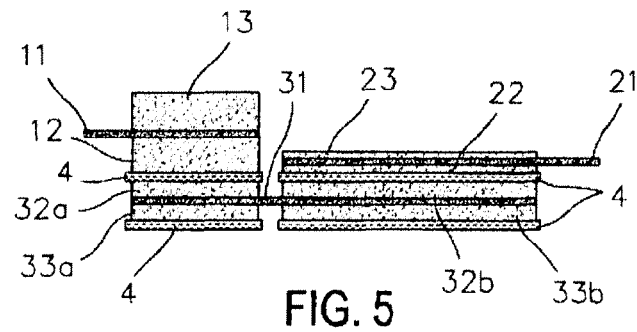

With reference to FIG. 5, another embodiment of a dissymmetrical supercapacitor is illustrated.

In this embodiment, the widths L1, L2 of the electrodes 12, 13 and 22, 23 of the juxtaposed complexes are different, the electrodes 32a, 33a, (32b, 33b respectively) of the common complex 3 being of a width equal to the width L1 (L2 respectively) of the electrodes of the juxtaposed complex 1 (2 respectively) facing it.

Moreover, the thickness of the electrodes 12, 13 of the first 1 of both juxtaposed complexes 1, 2 is different from the thickness of the electrodes 22, 23 of the second 2 of both juxtaposed complexes 1, 2.

The electrodes 32a, 32b, 33a, 33b of the common complex 3 are of identical thicknesses. Further, the thickness of the electrodes 32a, 32b, 33a, 33b of the common complex 3 is different from the thicknesses of the electrodes 12, 13 and 22, 23 of the juxtaposed complexes.

In this embodiment, the total thickness of the first supercapacitor—consisting of the first 1 of the two juxtaposed complexes 1, 2 and of the common complex portion facing the latter—is different from the total thickness of the second supercapacitor—consisting of the second 2 of the two juxtaposed complexes 1, 2 and of the common complex portion facing the latter.

In order to compensate for this total thickness difference of the supercapacitors, the supercapacitor may comprise spacers in order to facilitate the winding of the separators 4 and of the three complexes 1, 2, 3 for forming a wound element. Advantageously, these spacers may comprise layers of neutral material and/or a material identical with the one used for the separators.

In another embodiment, the electrodes 12, 13, 22, 23 of the juxtaposed complexes 1, 2 are of identical thickness but consist of different materials so as to exhibit different faradic densities.

Figure 6:
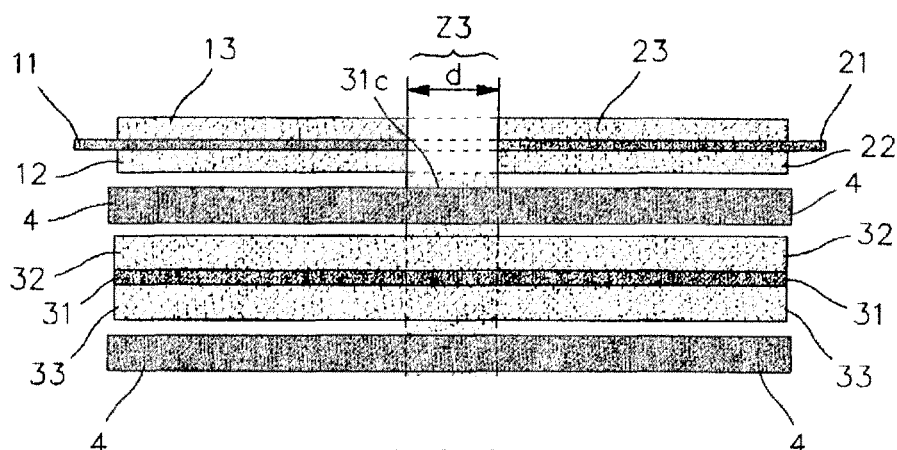

An embodiment is illustrated in FIG. 6, in which the common complex 3 only comprises two opposite electrodes 32, 33 positioned facing the juxtaposed complexes 1, 2. In this embodiment, the separator 4 positioned between the juxtaposed complexes 1, 2 and the common complex 3 is continuous.

The electrodes 12, 22, 32 of the complexes 1, 2, 3 may be of any width. Advantageously, the opposite electrodes 13, 23, 33 of each complex 1, 2, 3 are of identical width.

The collectors 11, 21 of the juxtaposed complexes 1, 2 extend beyond the electrodes 12, 13, 22, 23 towards the outside so as to allow connection of the supercapacitor (once it is wound) with other supercapacitors.

The separators 4 extend beyond the facing electrodes 12, 13, 22, 23, 32, 33 in order to avoid deterioration of the electrodes of the complexes 1, 2, 3.

The juxtaposed complexes 1, 2 are spaced apart by a distance d so as to obtain an electric discontinuity area. Advantageously, this distance d is provided to be sufficient for avoiding direct passage of the current from one of the juxtaposed complexes 1, 2 to the other one of the juxtaposed complexes 1, 2. For example, the distance d may be larger than one millimeter. A distance d of one millimeter is actually sufficient for preventing the electric field created between both juxtaposed complexes 1, 2 from being too large, which would risk decomposing the electrolyte under normal conditions of use of the supercapacitor. Indeed, the voltage of such a system is doubled with respect to that of a standard element from the prior state of the art, and this in a same casing, so that the electrolyte is subject to a double voltage, whence its risk of more rapid decomposition. The distance d between the juxtaposed complexes 1 and 2 is therefore selected so as to prevent the electrolyte from being exposed to this double voltage.

Advantageously, the area Z3 defined between both juxtaposed complexes 1, 2 may comprise an electric insulator, for example an empty space, a liquid or a gas. In order that this area may thereby be filled, the volume of electrolyte inside the casing will have been selected suitably so that it only impregnates the whole of the active material, without any excess, in order to leave the emptied spaces empty.

The collector portion 31c of the common complex 3 positioned facing the area Z3 defined between both juxtaposed complexes 1, 2 is a region of electric continuity of the common complex 3.

Figure 7:
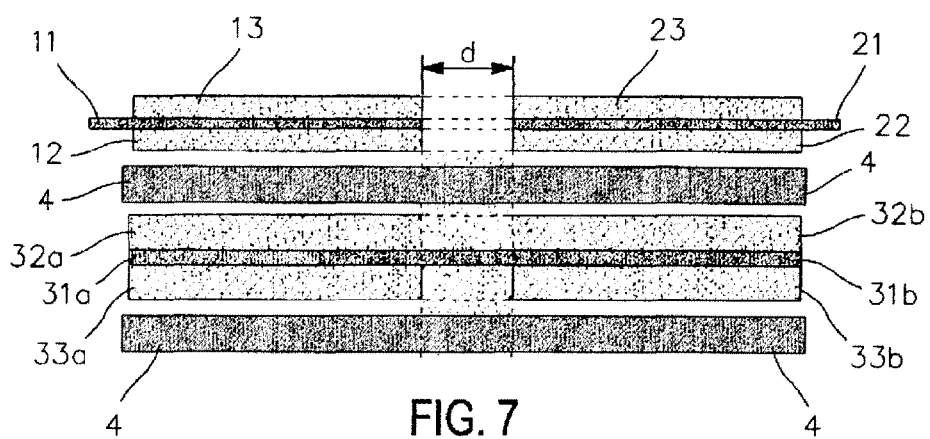

This region may be formed:
with a portion of the collector of the common complex in the case when the common complex 3 comprises a single and same collector, as illustrated in FIG. 6, or may be formed
with an electric connection such as for example a solder in the case when the common complex 3 comprises two juxtaposed collectors 31a, 31b soldered together, as illustrated in FIG. 7.

Figure 8:
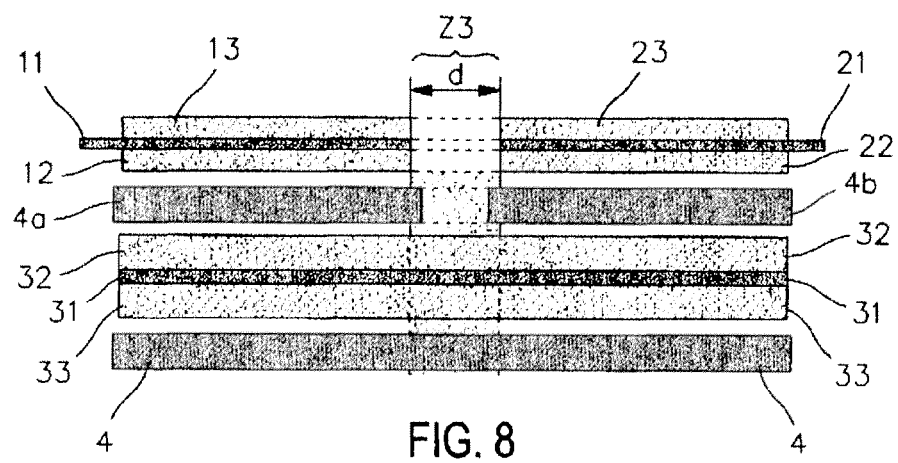

As illustrated in FIG. 8, the separator 4 positioned between the juxtaposed complexes 1, 2 and the common complex 3 may be discontinuous, i.e. consisting of two juxtaposed separators 4a, 4b. In this case, the distance between these juxtaposed separators 4a, 4b is advantageously less than the distance d between the juxtaposed complexes 1, 2. With this it is possible to guarantee electric insulation between the electrodes 12, 22 of the juxtaposed complexes 1, 2 and the electrodes 32a, 32b of the common complex 3, and thereby avoid risks of degradation of the complexes 1, 2, 3. The area defined between two juxtaposed separators 4a, 4b may comprise any type of insulating material, for example an empty space, or a gas or an insulating liquid.

Figure 9:
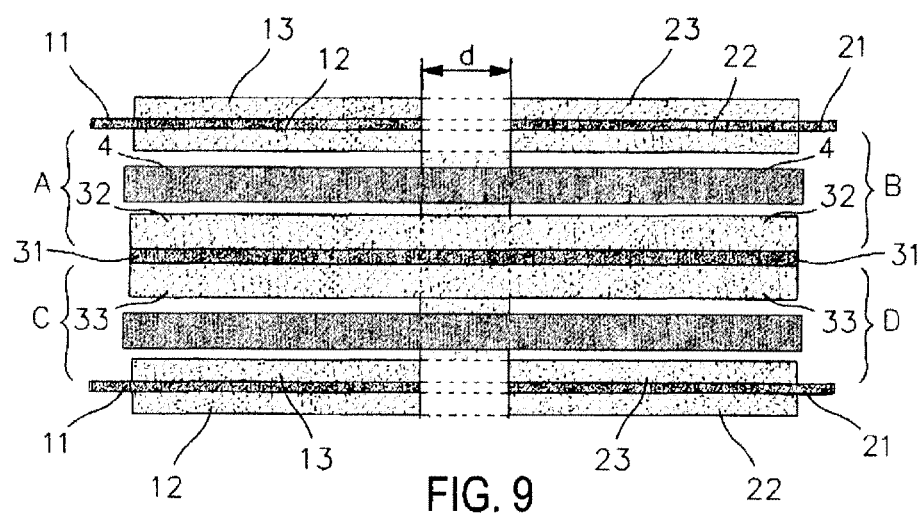

FIG. 9 illustrates two successive windings of the supercapacitor of FIG. 6, once the different complexes and separators are wound together in order to form a wound element.

The electrodes 12, 13, 22, 23, 32, 33 of the different complexes 1, 2, 3 form a plurality of supercapacitors.

The electrodes 12, 22 of the juxtaposed complexes 1, 2 facing the electrode 32 of the common complex 3 form, with this electrode 32 of the common complex 3 and separator 4 positioned between the common 3 and juxtaposed 1, 2 complexes of the first and second supercapacitors A, B electrically connected (to each other) in series by design of the winding.

The opposite electrodes 13, 23 of the juxtaposed complexes 1, 2 and the opposite electrode 33 of the common complex 3, with the separator 4, positioned between the opposite electrodes 13, 23, 33 of the different complexes 1, 2, 3, form third and fourth supercapacitors C, D electrically connected (to each other) in series by the design of the winding.

The first and second supercapacitors A, B are electrically connected in parallel with the third and fourth supercapacitors C, D by the design of the winding.

A supercapacitor comprising four supercapacitors A, B, C, D in the same wound element is thereby obtained.

Of course, the electrodes 12, 13, 22, 23, 32, 33 of the different complexes 1, 2, 3 may consist of different active materials in order to obtain dissymmetry, as described earlier (a different mixture of active materials for the electrodes of different complexes). Advantageously, it is possible to use different activated carbons for the different electrodes 12, 13, 22, 23, 32, 33 by adapting the size of the pores of the carbon to the size of the ions used.

It is also possible to act on the volume of the electrodes 12, 13, 22, 23, 32, 33 of the different complexes 1, 2, 3 in order to obtain dissymmetry.

Figure 10:
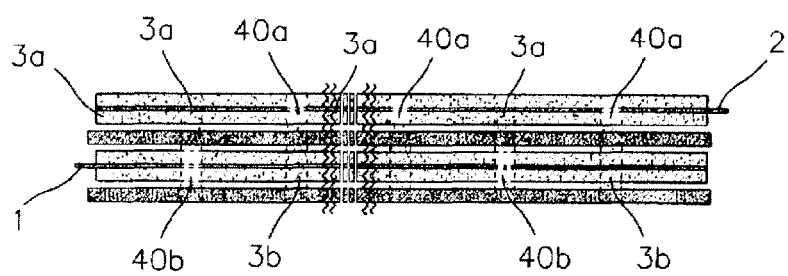

A supercapacitor comprising a number n of supercapacitors is illustrated in FIG. 10.

The supercapacitor comprises a plurality of complexes 1, 2, 3a, 3b alternately positioned above and below the separator 4.

Two contiguous complexes 3a (3b respectively) of the plurality of complexes are separated by a margin 40a (40b respectively) with non-zero width. The margins 40a between the juxtaposed complexes 3a located above the separator 4 are shifted relatively to the margins 40b between the juxtaposed complexes 3b located below the separator 4.

The electronic continuity of the complex common to two contiguous complexes—via an internal connection area to the common complex and positioned facing the margin 40—ensures the series connection of the two thereby formed supercapacitors.

A supercapacitor comprising n supercapacitors electrically connected in series is thereby obtained.

For the different embodiments illustrated in FIGS. 1-10, the margin 40 is obtained during the winding on a winding machine by carrying out simultaneous windings of the contiguous complexes spaced apart by the width provided for the margin 40.

In the case of a non-continuous separator (i.e. several juxtaposed separators between the juxtaposed complexes and the common complex), the same method may be used for producing the spacing between the separators.

The width d of the margin 40—corresponding to the gap between the juxtaposed complexes—is mechanically obtained by adequate positioning of the complexes upon starting the winding operation.

The width "d" of the margin 40 depends on the insulating material used.

If the margin 40 contains a gas (for example a solvent of the electrolyte in gaseous form), the voltage Un, applied to the element during normal operation, should be less than "d" times the breakdown field of the gas.

If the margin 40 contains a liquid, the total resistance of the margin 40 which is equal to $$\frac{1}{\sigma} \times \frac{d}{Le_c},$$

with $\sigma$ the conductivity of the electrolyte, N the total wound length and $e_c$ the thickness of the margin 40, should be greater than 1 k$\Omega$. This constraint sets the admissible value of the width d.

If the margin 40 contains an (electrically insulating) solid, the voltage Un between the juxtaposed complexes should be less than the breakdown field of the insulating material.

If the margin 40 contains a mixed structure, (mixture of different materials and/or different phases) the width d will be selected as being the largest of all the values.

Advantageously, the supercapacitor may comprise a stack of complexes.

For example, in an embodiment, the supercapacitor comprises two juxtaposed complexes having at least one facing common complex, separated from the juxtaposed complexes by a separator. The complexes and the separator are wound together in turns so as to form a first wound element. The supercapacitor also comprises two other juxtaposed complexes having another facing common complex, separated by another separator. The other complexes and the other separator are wound together in turns around the first wound element in order to form a second wound element. The first and second wound elements are separated by an electronically insulating space.

With this, it is possible to reduce the volume and the mass of the supercapacitor relatively to the volume and to the mass of the modules of the prior art comprising supercapacitors electrically connected through straps and lids.

This also allows a reduction in the manufacturing cost related to the purchase and to the mounting of the straps and lids, as well as the series resistance of the thereby obtained supercapacitor.

The supercapacitors may have different shapes. For example, the supercapacitors may be cylindrical.

The supercapacitors may also have a base with a hexagonal, or triangular, or octagonal, or rectangular or further elliptical shape orthogonally to the winding axis. With this, it is possible to limit the dead volume between two adjacent supercapacitors. The angles of the wound elements may be non-protruding.

General Case Allowing Demonstration of the Gain in Volume on a Multi-Track System As described earlier, the supercapacitor according to the invention provides reduction in the volume associated with the series electric connection of two supercapacitors as compared with the modules of the prior art.

Such a module of the prior art is illustrated in FIG. 11. The module comprises two supercapacitors 20. Each supercapacitor 20 comprises a cylindrical wound element comprising two electrodes and one separator. A portion 85 of the electrodes juts out towards the outside. The supercapacitors are connected in series by means of a connecting strap 70 and lids 90. Each lid 90 caps a respective supercapacitor 20 so as to be electrically connected to the latter at the electrode portion 85 jutting out outwards. Each lid 80 further comprises a connection terminal 80, capable of coming into contact with a through-bore of the strap 70, so as to electrically connect both supercapacitors 20 in series.

With reference to FIG. 12, an exemplary supercapacitor according to the invention is illustrated, formed by the design of two supercapacitors electrically connected in series. This supercapacitor is capable of being connected to an adjacent supercapacitor of the same type by means of a connecting strap.

In order to demonstrate the gain in volume of the supercapacitor illustrated in FIG. 12 relatively to the module illustrated in FIG. 11, the following parameters are required:
H: active height (cm)
e: height of the electrode portion extending beyond the wound element (cm)
$e_c$: thickness of the lid (cm)
$e_b$: thickness of the connecting strap (cm)
$\varnothing_{ext}$: outer diameter of the supercapacitor (cm)
d: width of the margin (with e>d) (cm)

From these parameters, it is possible to calculate the volumes of the module of the state of the art and of the supercapacitor according to the invention:
$N_n$: volume of the n-track supercapacitor of equivalent value C/n (cm$^3$)
V: volume of the module of the prior art comprising n supercapacitors of value C in series (cm$^3$).

For identical values h, $e_c$, $\varnothing_{ext}$, e, $e_t$, $e_b$ in FIGS. 11 and 12, one obtains:

$$V = \varnothing_{ext}^2 (\pi/4) n (h + 2e + 2e_c + 2e_b)$$

$$V_n = \varnothing_{ext}^2 (\pi/4)(nh + (n-1)d + 2e + 2e_c + 2e_b)$$

The volume difference ΔV between the module of the prior art and the supercapacitor according to the invention is therefore equal to:

$$V_n = \emptyset_{ext}^2(\pi/4)(n-1)(2e+2e_c+2e_b-d)$$

General Case Allowing Demonstration of the Gain in Mass on a Multi-Track System

In order to demonstrate the gain in mass of the supercapacitor illustrated in FIG. 12 as compared with the module illustrated in FIG. 11, the following parameters are also required:

$e_t$: thickness of the tube in which the wound elements are positioned (cm)
$m_u$: mass of the supercapacitor C (g)
$m_c$: mass of the lid of a supercapacitor of value C (g)
$m_b$: mass of the connecting strap (g)
ζ: specific gravity of the material of the tube and of the lid (g/cm³)

From these parameters, it is possible to calculate the following masses:

$m_t^C$: mass of the tube of a supercapacitor of value C (in a module of the prior art) (g)
$m_t^{C/n}$: mass of the tube of the n-track supercapacitors of equivalent value C/n (in the supercapacitor according to the invention) (g)
m: total mass of the n supercapacitors of value C in series (in a module of the prior art) (g)
$m_n$: total mass of the n-track supercapacitors of equivalent value C/n (in a supercapacitor according to the invention) (g)

For identical values h, $e_c$, $\emptyset_{ext}$, e, $e_t$, $e_b$ in FIGS. 11 and 12, one obtains:

$$m_t^C = \emptyset_{ext}\pi e_t(h+2e+2e_c)\zeta$$

$$m_t^{C/n} = \emptyset_{ext}\pi e_t(nh+(n-1)d+2e+2e_c)\zeta$$

$$m = n(m_u+m_t^C+2m_c)+(n-1)m_b$$

$$m_n = nm_u+2m_c+m_t^{C/n}$$

The mass difference Δm between the module of the prior art and the supercapacitor according to the invention is therefore equal to:

$$\Delta m = (n-1)(2m_c+\emptyset_{ext}\pi e_t(2e+2e_c-d)\zeta)$$

It is assumed in these calculations that the mass of the n-track coil is equal to n times the mass of the unit coil. It is known that this assumption is pessimistic since it is only true if d=2e. In the actual case, e is much larger than d.

Numerical Application of the Formulae Established Earlier

Comparison between a standard supercapacitor of 2,600 F and a two-track supercapacitor according to the invention of 2,600 F $m_u$=370 g
$\emptyset_{ext}$=7 cm
C=2,600 F
$e_t$=0.05 cm
h=8 cm
e=0.7 cm
$e_c$=0.3 cm
$e_b$=0.4 cm
d=0.4 cm
ζ=2.7 cm
Results
$m_c$=30 g
$m_b$=15 g
$m_t^C$=30 g
$m_t^{C/n}$=55 g m=935 g (total mass of 2 supercapacitors joined through a connecting strap)
$m_n$=855 g (mass of the two-track supercapacitor)
$V_n$=900 cm³
V=1,020 cm³

The gains in volume and mass of the supercapacitor according to the invention as compared with the module of the prior art are therefore: −11.7% in volume and 9% in mass.

Examples of Application of the Invention of Multi-Track Elements for Making Modules Let us consider a module of 12 elements positioned according to FIG. 13a. The mass of a 3,000 F element is 469 g, a mass including the lids and the tube. The module includes 11 connecting straps of 15 g each. The diameter of the elements is 6.85 cm and the unit height is 9 cm.

The volume of the 12 supercapacitors has the value of 3,980.1 cm³ according to the calculation:

$$V_{supercapacitors} = 12 \times \pi \times 9 \times 3.425^2 = 3,980.1 \text{ cm}^3$$

The supercapacitors are spaced apart by 2 mm between them (in order to avoid short-circuits). The whole of the supercapacitors is covered on the lower and upper face, with a free space of 2 mm and then is capped by lower and upper plates of 3 mm. These plates are in aluminium (d=2.7). The flanks of the module consist of 2 mm thick metal sheets in aluminium (d=2.7). The external volume of the module therefore has the value:

$$\begin{aligned}V_{external} &= (6.85 \times 6 + 0.2 \times 7) \times (6.85 \times 2 + 0.2 \times 3) \times \\ & \quad (9 + (0.3 + 0.2) \times 2) \\ &= 42.5 \times 14.3 \times 10 \\ &= 6,077.5 \text{ cm}^3\end{aligned}$$

The total mass of the module therefore has the value:

$$\begin{aligned}m_{module} &= (469 \times 12) + 11 \times 15 + (42.5 \times 14.3 \times 0.3 \times 2.7) \times 2 + \\ & \quad (10 \times 42.5 \times 0.2 \times 2.7) \times 2 + (10 \times 14.3 \times 0.2 \times 2.7) \times 2 \\ &= 5,628 + 165 + 985 + 459 + 154.5 \\ &= 7,391.5 \text{ g}\end{aligned}$$

Let us now consider a two-track 1,500 F element of double voltage as compared with the system described in the prior art. By keeping the same (height of the winding)/(diameter of the winding) ratio of the element of the prior art, the following height and diameter parameters are obtained for the two-track element:

$D_{winding}$=8.5 cm
$H_{winding}$=11 cm

The mass of a two-track element unit has the value of 863 g, a mass including both lids and the tube.

According to FIG. 13b, there are now 6 two-track elements connected together in series by 5 straps. The module includes 5 connecting straps of 17 g each.

The volume of the 6 two-track supercapacitors has the value of 3,745.2 cm³ according to the calculation:

$$V_{supercapacitors} = 6 \times \pi \times 11 \times 4.25^2 = 3,745.2 \text{ cm}^3$$

The supercapacitors are spaced apart by 2 mm between them (for avoiding short-circuits). The whole of the supercapacitors is covered, on the lower and upper face, with a free space of 2 mm and is then capped by lower and upper 3 mm plates. These plates are in aluminium (d=2.7). The flanks of the module consist of 2 mm thick aluminium sheets (d=2.7). The external volume of the module therefore has the value:

$$V_{external} = (8.5 \times 3 + 0.2 \times 4) \times (8.5 \times 2 + 0.2 \times 3) \times$$
$$(11 + (0.3 + 0.2) \times 2)$$
$$= 26.3 \times 17.6 \times 12$$
$$= 5,554.6 \text{ cm}^3$$

The total mass of the module therefore has the value:

$$m_{module} = (863 \times 6) + 5 \times 17 + (26.3 \times 17.6 \times 0.3 \times 2.7) \times 2 +$$
$$(12 \times 26.3 \times 0.2 \times 2.7) \times 2 + (12 \times 17.6 \times 0.2 \times 2.7) \times 2$$
$$= 5, 178 + 85 + 750 + 341 + 228$$
$$= 6,582 \text{ g}$$

Let us now consider a three-track 1,000 F element of triple voltage as compared with the system described in the prior art. By retaining the same (height of the winding)/(diameter of the winding) ratio of the element of the prior art, the following height and diameter parameters are obtained for the three-track element:
$D_{winding}$=9.7 cm
$H_{winding}$=12.3 cm The mass of a three-track element unit has the value of 1,251 g, a mass including both lids and the tube.

According to FIG. 13c, there are now 4 three-track elements connected together in series by 3 straps. The module includes 3 connecting straps of 20 g each.

The volume of the 4 three-track supercapacitors has the value 3,635.8 cm$^3$ according to the calculation:

$$V_{supercapacitors} = 4 \times \pi \times 12.2 \times 4.85^2 = 3,635.8 \text{ cm}^3$$

The supercapacitors are spaced out by 2 mm between them (for avoiding short-circuits). The whole of the supercapacitors is covered on the lower and upper face, with a 2 mm free space and is then capped by lower and upper 3 mm plates. These plates are in aluminium (d=2.7). The flanks of the module consist of 2 mm thick aluminium sheets (d=2.7). The external volume of the module therefore has the value:

$$V_{external} = (9.7 \times 2 + 0.2 \times 3) \times (9.7 \times 2 + 0.2 \times 3) \times$$
$$(12.3 + (0.3 + 0.2) \times 2)$$
$$= 20 \times 20 \times 13.3$$
$$= 5,320 \text{ cm}^3$$

The total mass of the module therefore has the value:

$$M_{module} = (1251 \times 4) + 3 \times 20 + (20 \times 20 \times 0.3 \times 2.7) \times 2 +$$
$$(20 \times 13.3 \times 0.2 \times 2.7) \times 2 + (13.3 \times 20 \times 0.2 \times 2.7) \times 2$$
$$= 5, 004 + 60 + 648 + 287.3 + 287.3$$
$$= 6,286.6 \text{ g}$$

The table below summarizes the gain in mass and in volume of the modules containing two-track or three-track elements as compared with the module described in the prior art. These gains in mass and in volume are identical with those obtained for the mass and bulk specific energy since the total voltage of the module is not changed:

| Number of elements in the module | Prior art: 12 elements 100 (FIG. 13a) | 6 two-track elements 110 according to the present invention (cf. FIG. 13b) | 4 three-track elements 120, according to the present invention (cf. FIG. 13c) |
|---|---|---|---|
| Total mass | 7,391.5 g | 6,582 g | 6,286.6 g |
| Total volume | 6,077.5 cm$^3$ | 5,554.6 cm$^3$ | 5,320 cm$^3$ |
| Gain in mass as compared with the prior state of the art | 0% | 12.3% | 17.5% |
| Gain in volume as compared with the prior state of the art | 0% | 9.4% | 14.2% |

Total Gain in Resistance

The gain in resistance is due to the absence of a strap and to the reduction in the number of lids.

The path of the electrons is therefore decreased relatively to the assembly of two distinct supercapacitors.

The equivalent resistance of an assembly of two supercapacitors is of the order of 0.4 mΩ. The equivalent resistance of a two-track element is evaluated to be 0.2 mΩ.

In this specific case, the resistance is therefore divided by 2.

The gain in resistance therefore gives the possibility of increasing the power density ($V^2/(4R_s)$).

The examples mentioned above are specifically explained for applications to supercapacitors, the reader will have understood that many modifications may be brought mutatis mutandis to the supercapacitor described earlier, in order to adapt to the configurations of various other contemplated storage elements such as batteries or battery cells, without materially departing from the new teachings and advantages described herein.

Therefore, all the modifications of this type are intended to be incorporated within the range of the supercapacitor as defined in the appended claims.

Herein two types of supercapacitors are presented.

The first type of supercapacitor (designated as "multitrack supercapacitor" hereafter) comprises at least two juxtaposed complexes spaced apart by a distance d and at least one common complex facing both juxtaposed complexes and separated from the latter by at least one separator, the separator and the complexes being wound together in a turn in order to form a wound element.

The second type of supercapacitor (designated as "multicoil supercapacitor" hereafter) comprises at least two complexes and at least one separator between both complexes, the complexes and the separator being wound together in turns in order to form a wound element, the multicoil supercapacitor being remarkable in that it further comprises at least one other complex and at least other separator, the other complex and the other separator being wound together in turns around the wound element so as to form at least one consecutive wound element, the successive wound elements being separated by an electronic insulating space.

The multitrack and multicoil supercapacitors have many advantages:

- for a multitrack or multicoil supercapacitor, with bulk energy identical with that of two standard supercapacitors, a lower voltage may be applied and it is therefore possible to very strongly limit the generation of gas and therefore increase the lifetime in a highly advantageous way,
- the internal volume of a multitrack or multicoil supercapacitor may advantageously be greater, per assembly, than the internal volume of two associated standard supercapacitors. In this case, the lifetime will also be increased.

Finally, in a module comprising a plurality of supercapacitors connected to each other, at least half of the series resistance of the module is a connection resistance between the coils and the lids.

In a module comprising a plurality of multitrack or multicoil supercapacitors, the series resistance of the module is strongly reduced, because of the reduction of the number of required junctions between the lid and the coil as compared with a module comprising a plurality of standard supercapacitors.

The multitrack supercapacitor further has advantages as compared with the multicoil supercapacitor.

Notably, the multitrack supercapacitor allows the use of lids and straps from the prior art for electrically connecting two adjacent multitrack supercapacitors.

Therefore, the method for manufacturing a multitrack supercapacitor is easier to adapt to existing supercapacitor manufacturing methods than the method for manufacturing a multicoil supercapacitor since it does not require the application of a step for soldering or manufacturing specific lids.

The invention claimed is:

1. A supercapacitor with a double electrochemical layer, comprising two juxtaposed complexes (1, 2) spaced apart by a distance d along a direction parallel to a longitudinal axis, and a common complex (3) facing each of the juxtaposed complexes (1, 2) and separated from the latter by at least one separator (4), each of said juxtaposed and common complexes including a current collector and at least one electrode, the separator (4) and said juxtaposed and common complexes (1, 2, 3) being wound together in turns along the longitudinal axis in order to form a wound element, wherein the separator (4) includes at least two portions spaced apart by a distance w of less than the distance d, each of the portions entirely separating said juxtaposed and common complexes (1, 2, 3) facing each other.

2. The supercapacitor according to claim 1, wherein the distance w is greater than 1 mm.

3. The supercapacitor according to claim 1, wherein said juxtaposed and common complexes (1, 2, 3) comprises two opposite electrodes (12, 13, 22, 23, 32, 33) on either side of a current collector (11, 21, 31) so that each electrode has an electrically conducting surface common with a respective face of the current collector.

4. The supercapacitor according to claim 1, wherein the common complex (3) comprises at least two juxtaposed electrodes (32a, 32b) spaced apart by a distance g, each electrode being positioned facing an electrode (12, 22) of said juxtaposed complexes (1, 2).

5. The supercapacitor according to claim 4, wherein the distance g is equal to the distance d.

6. The supercapacitor according to claim 4, wherein the electrodes (32a, 32b, 33a, 33h) of the common complex (3) are of different thicknesses.

7. The supercapacitor according to claim 4, wherein the widths of the electrodes (32a, 32b, 33a, 33b) of the common complex (3) are different.

8. The supercapacitor according to claim 1, wherein the thicknesses of the electrodes (12, 13, 22, 23) of the juxtaposed complexes (1, 2) are different.

9. The supercapacitor according to claim 1, wherein the lengths of the said juxtaposed and common complexes (1, 2, 3) facing each other are different.

10. The supercapacitor according to claim 1, wherein the widths of the electrodes (12, 13, 22, 23) of the juxtaposed complexes (1, 2) are different.

11. The supercapacitor according to claim 1, wherein the electrodes of said juxtaposed and common complexes (1, 2, 3) are of different natures.

12. The supercapacitor according to claim 1, wherein the lengths, widths, thicknesses and natures of the electrodes of the juxtaposed complexes (1, 2) are equal.

13. The supercapacitor according to claim 1, wherein a base of the wound element orthogonal to the winding axis is of circular shape.

14. The supercapacitor according to claim 13, wherein the angles of the wound element are non-protruding.

15. The supercapacitor according to claim 1, wherein a base of the wound element orthogonal to the winding axis is of hexagonal shape.

16. The supercapacitor according to claim 1, wherein a base of the wound element orthogonal to the winding axis is of triangular shape.

17. The supercapacitor according to claim 1, wherein a base of the wound element orthogonal to the winding axis is of orthogonal shape.

18. The supercapacitor according to claim 1, wherein a base of the wound element orthogonal to the winding axis is of rectangular shape.

19. The supercapacitor according to claim 1, wherein a base of the wound element orthogonal to the winding axis is of elliptical shape.

20. The supercapacitor according to claim 1, wherein the juxtaposed complexes have terminals exterior to said supercapacitor.

21. The supercapacitor according to claim 1, further comprising at least a third juxtaposed complex and a corresponding common complex for each said juxtaposed complex.

22. A module comprising:
   - a casing; and
   - at least one supercapacitor disposed in said casing, said supercapacitor with a double electrochemical layer, comprising two juxtaposed complexes (1, 2) spaced apart by a distance d along a direction parallel to a longitudinal axis, and a common complex (3) facing each of the juxtaposed complexes (1, 2) and separated from the latter by at least one separator (4), each of said juxtaposed and common complexes including a current collector and at least one electrode, the separator (4) and said juxtaposed and common complexes (1, 2, 3) being wound together in turns along the longitudinal axis in order to form a wound element, wherein the separator (4) includes at least two portions spaced apart by a distance w of less than the distance d, each of the portions entirely separating said juxtaposed and common complexes (1, 2, 3) facing each other.

23. The module according to claim 22, further comprising;
   - at least one standard supercapacitor including a cylindrical wound element including at least two electrodes and at least one separator wound together in turns in order to form a wound element positioned in the casing; and a lid for closing the casing,
said standard supercapacitor being electrically connected to the supercapacitor having the two juxtaposed complexes and the common complex via at least one connecting strap.

* * * * *

UNITED STATES PATENT AND TRADEMARK OFFICE
CERTIFICATE OF CORRECTION

PATENT NO. : 8,634,181 B2  
APPLICATION NO. : 12/918056  
DATED : January 21, 2014  
INVENTOR(S) : Philippe Azais, Olivier Caumont and Jean-Michel Depond Page 1 of 1

It is certified that error appears in the above-identified patent and that said Letters Patent is hereby corrected as shown below:

In the Claims, Column 15, Claim 6, line 66, please delete "33h" and insert --33b--.

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,634,181 B2
APPLICATION NO. : 12/918056
DATED : January 21, 2014
INVENTOR(S) : Philippe Azais, Olivier Caumont and Jean-Michel Depond It is certified that error appears in the above-identified patent and that said Letters Patent is hereby corrected as shown below:

In the Claims,

Column 16, Claim 9, line 8, please delete "of the said" and insert --of said--.

Signed and Sealed this
Seventh Day of October, 2014

Michelle K. Lee
*Deputy Director of the United States Patent and Trademark Office*